N. J. GREENISON.
BICYCLE PROPELLING MEANS.
APPLICATION FILED OCT. 4, 1921.
1,427,589.
Patented Aug. 29, 1922.
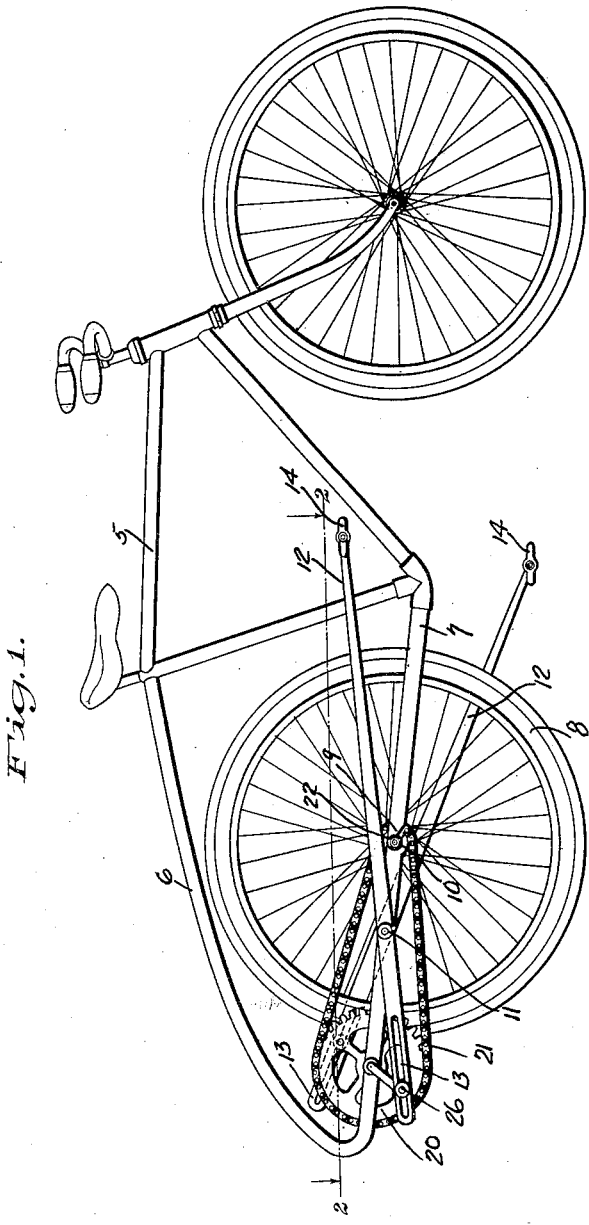
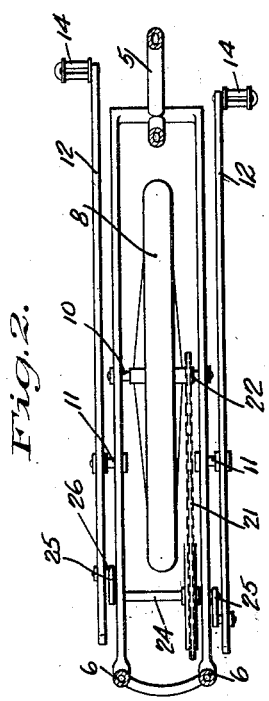
WITNESSES
INVENTOR
N. J. GREENISON
BY
ATTORNEYS

UNITED STATES PATENT OFFICE.

NELSON J. GREENISON, OF NEW YORK, N. Y.

BICYCLE PROPELLING MEANS.

1,427,589.

Specification of Letters Patent.  Patented Aug. 29, 1922.

Application filed October 4, 1921. Serial No. 505,360.

*To all whom it may concern:*

Be it known that I, NELSON J. GREENISON, a citizen of the United States, and a resident of the city of New York, borough of the Bronx, in the county of Bronx and State of New York, have invented a new and Improved Bicycle Propelling Means, of which the following is a full, clear, and exact description.

The present invention relates to new and useful improvements in bicycles and the like, and it pertains more particularly to a driving means therefor.

It is one of the objects of the invention to provide a new and improved bicycle propulsion in which greater leverage may be obtained, thus greatly reducing the effort attendant the driving operation.

With the above and other objects in view, reference is had to the accompanying drawings, in which—

Figure 1 is a view in side elevation of a bicycle provided with a driving means formed in accordance with the present invention;

Fig. 2 is a horizontal sectional view taken on the line 2—2 of Fig. 1.

Referring more particularly to the drawings, the reference character 5 designates the frame of the bicycle and the upper rear members 6 and the lower rear members 7 of said frame are extended rearwardly to a point beyond the rear of the rear wheel 8. The lower rear members 7 are each provided with a rearwardly-extending angularly-disposed slot 9, and the rear wheel 8 is mounted in said slot by means of an axle 10 in the ordinary manner. Pivotally connected to each of the lower rear members 7 as at 11, is a lever 12, and each lever has its rear end formed with an elongated slot 13. The forward end of each of these levers is provided with a foot pedal 14, as shown.

Mounted between the lower rear frame members 7, is a sprocket 20, and passing around said sprocket 20 is a chain 21, which also passes around a sprocket 22 secured to the rear wheel 8. The sprocket 20 is mounted on a shaft 24, which shaft is provided on each of its ends with a crank 25.

Each of these cranks 25 has an arm 26 operating in the elongated slot 13 of its respective pivoted lever 12.

The device operates in the following manner:

As the rider exerts pressure upon the foot pedals 14, the levers 12 are rocked about their pivotal points, and through the medium of the elongated slots 13 and the cranks 25, the sprocket wheel 20 will be rotated. As the sprocket wheel 20 is rotated, the rear wheel 8 of the bicycle will likewise be rotated through the medium of the chain 21.

By this construction, it is apparent that the present invention provides means for increasing the power applied to the rear wheel of a bicycle thus greatly reducing the effort of operation.

While in the present instance the mechanism has been described and shown as a part of a bicycle, it is obvious that the same is applicable in other connections where foot power is employed, without departing from the spirit of the invention.

I claim—

In a bicycle, a frame having a rearwardly-extending portion projecting beyond the rear wheel thereof, a sprocket mounted in such rearwardly-extending portion, cranks carried by the sprocket, a plurality of levers pivotally connected to the frame in such a manner that the forward end of each of said levers is longer than the rear end thereof, said levers being immovably carried with respect to the frame, a slot provided in the rear end of each of said levers and adapted to receive its respective crank of the sprocket, a sprocket carried by the rear wheel of the bicycle, and a chain passing around said sprockets whereby upon operation of the levers about their pivotal point, the first-mentioned sprocket will be rotated and through the medium of said chain will drive the second-mentioned sprocket and the rear wheel of the bicycle.

NELSON J. GREENISON.